(12) United States Patent
Tada et al.

(10) Patent No.: US 7,351,338 B2
(45) Date of Patent: Apr. 1, 2008

(54) POROUS MEMBRANE OF VINYLIDENE FLUORIDE RESIN AND PROCESS FOR PRODUCING THE SAME

(75) Inventors: Yasuhiro Tada, Ibaraki-Ken (JP); Takeo Takahashi, Ibaraki-Ken (JP); Toshiya Mizuno, Ibaraki-Ken (JP)

(73) Assignee: Kureha Corporation, Tokyo (JP)

( * ) Notice: Subject to any disclaimer, the term of this patent is extended or adjusted under 35 U.S.C. 154(b) by 392 days.

(21) Appl. No.: 10/548,826

(22) PCT Filed: Mar. 10, 2004

(86) PCT No.: PCT/JP2004/003074

§ 371 (c)(1),
(2), (4) Date: Sep. 13, 2005

(87) PCT Pub. No.: WO2004/081109

PCT Pub. Date: Sep. 23, 2004

(65) Prior Publication Data

US 2006/0178480 A1    Aug. 10, 2006

(30) Foreign Application Priority Data

Mar. 13, 2003   (JP) .............................. 2003-068689
Apr. 16, 2003   (JP) .............................. 2003-112012

(51) Int. Cl.
*B01D 39/00*   (2006.01)

(52) U.S. Cl. .......................... 210/500.23; 210/500.27; 210/500.36; 210/500.42; 428/357; 264/41; 264/178 R; 264/203; 264/209.1

(58) Field of Classification Search ................ 428/357; 525/199; 210/500.23, 500.27, 500.36, 500.42; 264/41, 211.19, 178 R, 203, 209.1, 210.1, 264/210.8, 211.16, 171.12, 171.14, 181; 95/45

See application file for complete search history.

(56) References Cited

U.S. PATENT DOCUMENTS

| 5,238,613 | A | * | 8/1993 | Anderson .................... 264/425 |
| 5,489,406 | A | * | 2/1996 | Beck et al. .................... 264/41 |
| 5,510,421 | A | * | 4/1996 | Dennison et al. ............ 525/204 |
| 5,514,461 | A | * | 5/1996 | Meguro et al. ........... 428/310.5 |
| 5,656,372 | A | * | 8/1997 | Gentile et al. ............... 428/376 |
| 5,981,614 | A | * | 11/1999 | Adiletta ....................... 521/145 |
| 6,512,032 | B1 | * | 1/2003 | Ohira et al. ................. 524/128 |

(Continued)

FOREIGN PATENT DOCUMENTS

| JP | 58-93734 | 6/1983 |
| JP | 3-14840 | 1/1991 |
| JP | 4-265132 | 9/1992 |
| JP | 2000-309672 | 11/2000 |
| JP | 2002-66272 | 3/2002 |
| JP | 2003-236351 | 8/2003 |
| JP | 2004-33854 | 2/2004 |

*Primary Examiner*—N. Edwards
(74) *Attorney, Agent, or Firm*—Wenderoth, Lind & Ponack, L.L.P.

(57) ABSTRACT

There is provided a porous membrane of vinylidene fluoride resin which has pores of appropriate size and distribution and also excellent mechanical strength represented by tensile strength and elongation at break and is useful as a microfiltration membrane or a separator for batteries. The porous membrane of vinylidene fluoride resin is characterized by the presence in mixture of a crystalline oriented portion and a crystalline non-oriented portion as confirmed by X-ray diffraction, and is produced by subjecting a melt-extruded composition obtained by mixing a vinylidene fluoride resin having a molecular weight distribution which is appropriately broad and high as a whole with a plasticizer and a good solvent for vinylidene fluoride resin, to cooling for solidification from one surface, extraction of the plasticizer and stretching.

20 Claims, 7 Drawing Sheets

EXAMPLE 5 (OUTER SURFACE)

U.S. PATENT DOCUMENTS

| | | | |
|---|---|---|---|
| 6,843,948 B2 * | 1/2005 | Ohira et al. | 264/172.17 |
| 2002/0155311 A1 * | 10/2002 | Mayes et al. | 428/522 |
| 2003/0198825 A1 * | 10/2003 | Mayes et al. | 428/522 |
| 2005/0032982 A1 * | 2/2005 | Muller | 525/191 |
| 2006/0178480 A1 * | 8/2006 | Tada et al. | 525/199 |
| 2007/0039872 A1 * | 2/2007 | Tada et al. | 210/500.23 |
| 2007/0215540 A1 * | 9/2007 | Tada et al. | 210/500.23 |
| 2007/0241050 A1 * | 10/2007 | Tada et al. | 210/500.23 |
| 2007/0262017 A1 * | 11/2007 | Shinada et al. | 210/490 |

* cited by examiner

EXAMPLE 5

EXAMPLE 5 (OUTER SURFACE)

EXAMPLE 5 (INNER SURFACE)

EXAMPLE 5 (CROSS SECTION PROXIMATE TO OUTER SURFACE)

EXAMPLE 5(CROSS SECTION PROXIMATE TO INNER SURFACE)

POROUS MEMBRANE OF VINYLIDENE FLUORIDE RESIN AND PROCESS FOR PRODUCING THE SAME

TECHNICAL FIELD

The present invention relates to a porous membrane which is used for microfiltration for drugs or bacteria, or used as a separator of a battery, more particularly to a porous membrane of vinylidene fluoride resin which is excellent in mechanical strength such as tensile strength and elongation at break and has a narrow pore diameter distribution, and a process for production thereof.

BACKGROUND ART

Hitherto, porous membranes of synthetic resins have been used in many technical fields as separation membranes for gas separation, gas-liquid separation, solid-liquid separation, etc., or as insulating materials, lagging materials, sound insulators and thermal insulators. Among these, for separation membranes, the following properties are required as affecting the separation performances. First, the porous membrane is required to have an appropriate porosity in view of the separation efficiency and a uniform pore diameter distribution for a better separation accuracy. In addition, it is required to have a pore diameter optimum for an objective material to be separated. Further, the materials forming the membrane are required to have a chemical resistance to the objective material subjected to separation, weatherability, heat resistance, strength, etc. Further, the materials are required to have sufficient elongation at break and strength at break as mechanical strengths for use as the porous membrane.

From the above view point, conventionally developed porous membranes of polyolefin resins (e.g., JP-B 46-40119 and JP-B 50-2176) have left problems in respects of reverse washing and chemical resistance for ozone treatment after the use thereof as a separation membrane.

Vinylidene fluoride resins are excellent in weatherability, chemical resistance, heat resistance, strength, etc., and have been studied for their use as a porous membrane for separation. However, while the vinylidene fluoride resins have the above-mentioned excellent properties, they do not necessarily have desirable formability because of their non-adhesiveness and poor compatibility. In addition, development of porous membranes have been focused on the provision of a high porosity and a narrow pore diameter distribution for improving the separation performance, and no product having satisfactory mechanical strengths has been obtained. Accordingly, when a porous membrane is used as a filter membrane, a supporting membrane is superposed on the porous membrane to enhance the mechanical properties at present. Further, in the case of using a porous membrane as a separator of batteries, it is desired for the porous membrane to have sufficient mechanical properties, such as elongation at break and strength at break sufficient to be durable in a winding step in production of the batteries as the membrane is used in the form of being wound about a core material. Further, when used as a separator of batteries, the porous membrane is desired to have a narrow distribution range of penetrating pore diameters capable of preventing the passing therethrough of fine powdery active substances in the electrodes and a high efficiency in impregnation with an electrolytic solution which is performed after winding the porous membrane about the core material Further, when used as a microfiltration membrane, it is desired for the membrane to retain a high filtering performance for a long period.

As a process for producing a porous membrane of a vinylidene fluoride resin, JP-A 3-215535 has disclosed a process of mixing an organic liquid, such as diethyl phthalate, and hydrophobic silica as inorganic fine powder with a vinylidene fluoride resin, melt-forming the mixture and then extracting the organic liquid and inorganic fine powder. The thus-obtained porous membrane has a relatively large mechanical strength. However, as an alkaline aqueous solution is used for extracting the hydrophobic silica in the process, the vinylidene fluoride resin constituting the membrane is liable to be deteriorated.

On the other hand, our research group has also made several proposals of process for producing porous membranes of vinylidene fluoride resin used as a microfiltration membrane or a separator of batteries. Those are, for example, a process of subjecting a vinylidene fluoride resin to steps of crystallization, heat treatment, stretching and heat treatment under tension, thereby forming a porous membrane (JP-A 54-62273); a process of forming a film of a vinylidene fluoride resin of a specific molecular weight together with a plasticizer, cooling the film from one side thereof and then extracting the plasticizer (JP-A 7-13323); a process of blending with a vinylidene fluoride resin of an ordinary molecular weight, a vinylidene fluoride resin of a high molecular weight for providing an increased heat distortion resistance and an organic pore-forming agent or an inorganic pore-forming agent, forming a film of the blend and then converting the film into a porous membrane by removing the pore-forming agent by extraction or by stretching the film with the inorganic pore-forming agent as stress-concentration nuclei during the stretching in the case of using such an inorganic pore-forming agent (JP-A 2000-309672); etc. However, in the case of extraction of a plasticizer or an organic pore-forming agent, the resultant porous membrane is liable to fail in exhibiting filtering performance (water permeation rate or permeability) or mechanical properties required when the porous membrane is used as a filtering membrane. On the other hand, when the stretching of the membrane is tried in order to improve these properties, the membrane is liable to be severed so that a sufficient ratio of stretching cannot be effected. Particularly, in the case of being used as a microfiltration membrane, the membrane generally has a thickness of at least 50 μm so as to be durable against the filtration pressure, whereas the stretchability of such a relatively thick membrane having a thickness of at least 50 μm becomes inferior remarkably.

Consequently, there has not been actually obtained a porous membrane of vinylidene fluoride resin which has fine pores of appropriate size and distribution, also has excellent mechanical strengths and is therefore suitable as a microfiltration membrane or a separator of batteries.

DISCLOSURE OF INVENTION

Accordingly, a principal object of the present invention is to provide a porous membrane of vinylidene fluoride resin which has fine pores of appropriate size and distribution, and also excellent mechanical strengths represented by tensil strength and elongation at break.

Another object of the present invention is to provide a stable and efficient process for producing such a porous membrane of vinylidene fluoride resin as described above.

As a result of our study with the above-mentioned objects, we have found it possible to obtain a porous membrane provided with fine pores of appropriate size and distribution and also well-retained mechanical strengths by melt-extruding a vinylidene fluoride resin of a relatively broad molecular weight distribution together with a solvent and a plasticizer therefor, followed by cooling under a controlled condition, extraction of the plasticizer and stretching. The thus-obtained porous membrane of vinylidene fluoride resin is characterized by the presence in mixture of a crystalline oriented portion and a crystalline non-oriented portion as confirmed by X-ray diffraction.

More specifically, the porous membrane of vinylidene fluoride resin according to the present invention comprises: a porous membrane of (A) a vinylidene fluoride resin having a weight-average molecular weight of at least 200,000 and a ratio of weight-average molecular weight/number-average molecular weight of at least 2.5, or (B) a vinylidene fluoride resin comprising 2-75 wt. % of a first vinylidene fluoride resin having a weight-average molecular weight of 400,000- 1,200,000 and 25-98 wt. % of a second vinylidene fluoride resin having a weight-average molecular weight of 150,000- 600,000 giving a ratio of the weight-average molecular weight of the first vinylidene fluoride resin/the weight-average molecular weight of the second vinylidene fluoride resin of at least 1.2, wherein a crystalline oriented portion and a crystalline non-oriented portion are present in mixture as confirmed by X-ray diffraction.

Further, the process for producing a porous membrane of vinylidene fluoride resin according to the present invention comprises: providing a composition by adding 70-250 wt. parts of a plasticizer and 5-80 wt. parts of a good solvent for vinylidene fluoride resin to 100 wt. parts of the above-mentioned vinylidene fluoride resin (A) or (B); melt-extruding the composition to form a film; cooling the film preferentially from one surface thereof to form a solid film; extracting the plasticizer; and then stretching the film.

It is considered that several factors synergistically contribute to the production of a porous membrane of vinylidene fluoride resin having desirable properties in the process of the present invention. As a summary explanation, however, it is believed attributable to the fact that a film or membrane of vinylidene fluoride resin having a controlled crystallinity and fine pores after the extraction of the plasticizer can be formed up to the steps of cooling and extraction, so that the smooth stretching of a vinylidene fluoride resin film that has been hitherto difficult has become possible to stably form a porous membrane having a further desirable pore size (distribution). Particularly effectively contributing factors may be raised as follows. (a) By the use of a vinylidene fluoride resin having a broad molecular weight distribution representatively obtainable by a method of adding to an ordinary molecular weight vinylidene fluoride resin a high molecular weight vinylidene fluoride resin which has been recognized as a component for providing an improved heat distortion resistance in the process of the above-mentioned JP-A 2000-309672, the growing rate of (spherulite) crystal is suppressed during the cooling from one surface of the film after the melt-extrusion to provide a film having a crystallinity suitable for subsequent stretching. (b) The cooling from one surface of the film after the melt-extrusion results in a moderate crystallite size distribution (that becomes finer toward the cooled surface and coarser toward the other side) which makes smooth the subsequent stretching. (c) Pores formed by removal of the plasticizer after the extraction of the plasticizer from the cooled and solidified film render the resultant film or membrane flexible to facilitate the stretching and also result in nuclei of stretching stress concentration, thereby finally providing a membrane after the stretching with an alternate distribution of fibril portions and non-stretched node portions which lead to a uniform pore distribution and contribute to maintenance of strength of the membrane.

BEST MODE FOR PRACTICING THE INVENTION

Figure 1:
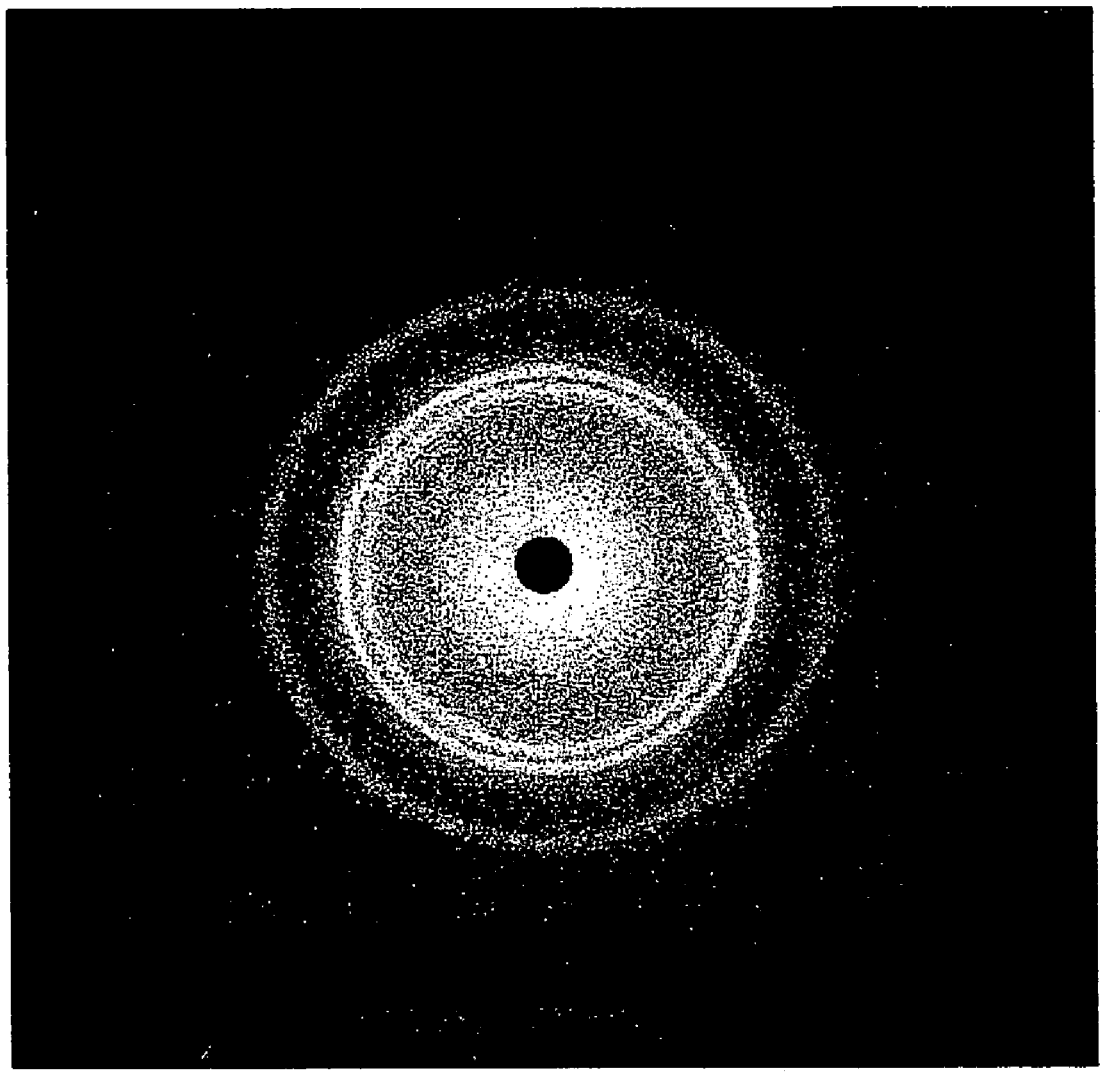
FIG. 1 is an X-ray diffraction picture of a porous hollow yarn of vinylidene fluoride resin obtained by Example 5.

Hereinbelow, the porous membrane of vinylidene fluoride resin of the present invention is described along the steps of the production process according to the present invention which is a preferred process for production thereof.

(Vinylidene Fluoride Resin)

A principal membrane-forming material used in the present invention is (A) a vinylidene fluoride resin having a weight-average molecular weight of at least 200,000 and a ratio of weight-average molecular weight/number-average molecular weight of at least 2.5 (i.e., having a broad molecular weight distribution); or (B) a vinylidene fluoride resin comprising 2-75 wt. % of a first vinylidene fluoride resin having a weight-average molecular weight of 400,000-1, 200,000 and 25-98 wt. % of a second vinylidene fluoride resin having a weight-average molecular weight of 150,000- 600,000 giving a ratio of the weight-average molecular weight of the first vinylidene fluoride resin/the molecular weight molecular weight of the second vinylidene fluoride resin of at least 1.2.

The vinylidene fluoride resin used in the present invention may be homopolymer of vinylidene fluoride, i.e., polyvinylidene fluoride, or a copolymer of vinylidene fluoride together with a monomer copolymerizable with vinylidene fluoride, or a mixture of these. Examples of the monomer copolymerizable with vinylidene fluoride may include: tetrafluoroethylene, hexafluoropropylene, trifluoroethylene, chlorotrifluoroethylene and vinyl fluoride, which may be used singly or in two or more species. The vinylidene fluoride resin may preferably comprise at least 70 mol % as the constituent unit. Among these, it is preferred to use homopolymer consisting of 100 mol. % of vinylidene fluoride in view of its high mechanical strength.

A vinylidene fluoride resin of a relatively high vinylidene fluoride content as described above may preferably be obtained by emulsion polymerization or suspension polymerization, particularly preferably by suspension polymerization, and the above-mentioned vinylidene fluoride resin (A) of a broad molecular weight distribution can be obtained by successively changing the polymerization conditions. More conveniently, however, it is preferred to obtain at least two types of vinylidene fluoride resins having different average molecular weights respectively through polymerization, and blend these resins to obtain the vinylidene fluoride resin (B) having a weight-average molecular weight/number-average molecular weight ratio of at least 2.5 for use in the present invention. According to a preferred embodiment of the present invention, a mixture of 5-75 wt. % of the above-mentioned first vinylidene fluoride resin and 25-95 wt. % of the above-mentioned second vinylidene fluoride resin is used a principal starting material of the membrane.

The vinylidene fluoride resin used in the present invention may preferably be a non-crosslinked one for easiness of melt-extrusion of the composition described below, and may preferably have a melting point of 160-220° C., more preferably 170-180° C., further preferably 175-179° C. Below 160° C., the resultant porous membrane is liable to have an insufficient heat distortion resistance, and above 220° C., the melt-mixability of the resin is lowered so that the formation of a uniform film or membrane becomes difficult.

The melting point means a heat absorption peak temperature accompanying crystal melting of the resin as measured by means of a differential scanning calorimeter (DSC).

According to the present invention, a plasticizer and a good solvent for vinylidene fluoride resin are added to the above-mentioned vinylidene fluoride resin to form a starting composition for formation of the membrane.

(Plasticizer)

As the plasticizer, aliphatic polyesters of a dibasic acid and a glycol may generally be used. Examples thereof may include: adipic acid-based polyesters of e.g., the adipic acid-propylene glycol type, and the adipic acid-1,3-butylene glycol type; sebacic acid-based polyesters of, e.g., the sebacic acid-propylene glycol type; and azelaic acid-based polyesters of e.g., the azelaic acid-propylene glycol type type, and azelaic acid-1,3-butylene glycol type.

(Good Solvent)

As the good solvent for vinylidene fluoride resin, those capable of dissolving vinylidene fluoride resin in a temperature range of 20-250° C. may be used. Examples thereof may include: N-methylpyrrolidone, dimethylformamide, dimethylacetamide, dimethyl sulfoxide, methyl ethyl ketone, acetone, tetrehydrofuran, dioxane, ethyl acetate, propylene carbonate, cyclohexane, methyl isobutyl ketone, dimethyl phthalate, and solvent mixtures of these. N-methylpyrrolidone (NMP) is particularly preferred in view of its stability at high temperatures.

(Composition)

The starting composition for formation of the membrane may preferably be obtained by mixing 70-250 wt. parts of the plasticizer and 5-80 wt. parts of the good solvent with 100 wt. parts of the vinylidene fluoride resin.

Below 70 wt. parts of the plasticizer, the resultant membrane is liable to have a lower porosity, thus resulting in a battery separator exhibiting poor impregnatabity with an electrolytic solution or an increased electric resistance, or a microfiltration membrane exhibiting a poor filtration performance (water permeation rate). On the other hand, above 250 wt. parts, the resultant membrane is liable to have an excessively high porosity and a lower mechanical strength.

Below 5 wt. parts of the good solvent, the uniform mixing of the vinylidene fluoride resin and the plasticizer is liable to be failed or require a long time. On the other hand, above 80 wt. parts, a high porosity cannot be attained corresponding to the amount of the plasticizer. In other words, an effective pore formation due to the extraction of the plasticizer is obstructed.

The total amount of the plasticizer and the good solvent may preferably be in the range of 100-250 wt. parts. These are both effective for reducing the viscosity of the melt-extruded composition and can function substitutively for each other to some extent. Among them, the good solvent should preferably occupy 5-30 wt. %.

(Mixing and Melt-extrusion)

The melt-extrusion composition may be extruded into a film by extrusion through an annular nozzle or a T-die at a temperature of 140-270° C., preferably 150-270° C. Accordingly, the manners of mixing and melting of the vinylidene fluoride resin, plasticizer and good solvent are arbitrary as far as a uniform mixture in the above-mentioned temperature range can be obtained consequently. According to a preferred embodiment for obtaining such a composition, a twin-screw kneading extruder is used, and the vinylidene fluoride resin (preferably in a mixture of the first and second vinylidene fluoride resins) is supplied from an upstream side of the extruder and a mixture of the plasticizer and the good solvent is supplied at a downstream position to be formed into a uniform mixture until they pass through the extruder and are discharged. The twin-screw extruder may be provided with a plurality of blocks capable of independent temperature control along its longitudinal axis so as to allow appropriate temperature control at respective positions depending on the contents of the materials passing therethrough.

(Cooling)

In the process of the present invention, the melt-extruded film product is cooled and solidified from one surface. As for a flat sheet product extruded through a T-die, the cooling may be performed by causing the sheet to contact a surface temperature-controlled cooling drum or roller, and as for a hollow yarn film extruded through a nozzle, the cooling may be effected by causing the film to path through a cooling medium, such as water. The temperature of the cooling drum etc. or cooling medium can be selected from a broad temperature range but may preferably be in a range of 10-100° C., particularly preferably 30-80° C.

(Extraction)

The cooled and solidified film product is then introduced into an extraction liquid bath to remove the plasticizer and the good solvent therefrom. The extraction liquid is not particularly restricted provided that it does not dissolve the vinylidene fluoride resin while dissolving the plasticizer and the good solvent. Suitable examples thereof may include: polar solvents having a boiling point on the order of 30-100° C., inclusive of alcohols, such as methanol and isopropyl alcohol, and chlorinated hydrocarbons, such as dichloromethane and 1,1,1-trichloroethane.

(Heat Treatment)

The film or membrane product after the extraction may preferably be heat treated at a temperature in a range of 80-160° C., preferably 100-140° C., for 1-3600 sec., preferably 3-900 sec. to increase its crystallinity for the purpose of providing an improved processability for subsequent stretching.

(Stretching)

The film or membrane product after the extraction is then subjected to stretching for increasing the porosity and pore size and improving the strength and elongation. The stretching can be effected as biaxial stretching, e.g., by tentering, but may generally preferably be effected as uniaxial stretching in the longitudinal direction of the film or membrane product as by a pair of rollers rotating at different peripheral speeds. This is because it has been found that a microscopic texture including a stretched fibril portion and a non-stretched node portion appearing alternately in the stretched direction is preferred for the porous membrane of vinylidene fluoride resin of the present invention to exhibit a harmony of porosity and strength-elongation thereof. The stretching ratio may appropriately be 1.2-4.0 times, particularly ca. 1.4-3.0 times.

(Elution Liquid Treatment)

Through the above-mentioned steps, a porous membrane of vinylidene fluoride resin according to the present invention is obtained, but it is particularly preferred to subject the porous membrane to a treatment of immersion in an elution liquid. This is because owing to the elution liquid treatment, the porous membrane of the present invention can be provided with a remarkably increased water permeability without essentially impairing the characteristic properties thereof. As the elution liquid, an alkaline liquid, an acidic liquid or an extraction liquid for the plasticizer is used.

The reason why the water permeability of the porous membrane is remarkably increased by the elution liquid treatment has not been fully clarified as yet, but it is presumed that the plasticizer is exposed at the minute pore wall enlarged in diameter by the stretching and is effectively removed by the elution liquid treatment. The alkaline or acidic liquid as the elution liquid is considered to decompose and solubilize the polyester used as the plasticizer for the vinylidene fluoride resin, thereby promoting the elution and removal thereof.

Accordingly, as the alkaline liquid, it is preferred to use an aqueous solution or a solution in water/alcohol of a strong base, such as sodium hydroxide, potassium hydroxide or calcium hydroxide, at a pH of at least 12, preferably 13 or higher. On the other hand, as the acidic liquid, it is preferred to use an aqueous solution or a solution in water/alcohol of a strong acid, such as hydrochloric acid, sulfuric acid or phosphoric acid at a pH of at most 4, preferably 3 or lower.

Further, as the extraction liquid for the plasticizer, those dissolving the plasticizer without dissolving the vinylidene fluoride resin can be used without particular restriction similarly as the one used before the stretching. For example, polar solvents having a boiling point of ca. 30-120° C. are suitably used, inclusive of alcohols, such as methanol and isopropyl alcohol, and chlorinated hydrocarbons, such as dichloromethane, and 1,1,1-trichloromethane.

The elution liquid treatment may be effected by immersing the porous membrane in the elution liquid at a temperature of ca. 5-100° C. for 10 sec. to 6 hours, after an optional pre-immersion for improving the affinity to the liquid. In case where the elution liquid treatment is performed at an elevated temperature, it is preferred to fix the porous membrane so as not to cause the shrinkage thereof during the treatment.

(Porous Membrane of Vinylidene Fluoride Resin)

The porous membrane of vinylidene fluoride resin of the present invention obtained as described above may be generally provided with properties, inclusive of a porosity of 55-90%, preferably 60-85%, particularly preferably 65-80%; a tensile strength of at least 5 MPa, an elongation at break of at least 5%, a tensile yield stress of at least 5 MPa, preferably at least 6 MPa, a yield elongation of at least 3%, preferably at least 5%, and when used as a water-filtering membrane, a water permeation rate of at least 5 $m^3/m^2 \cdot day$ at 100 kPa. The thickness is ordinarily in the range of 5-800 µm, preferably 50-600 µm, particularly preferably 150-500 µm. In the case of a hollow yarn form, the outer diameter may suitably be on the order of 0.3-3 mm, particularly ca. 1-3 mm.

Further, a micro-texture characteristic of the porous membrane of vinylidene fluoride resin according to the present invention is that it comprises a crystalline oriented portion and a crystalline non-oriented portion (random oriented portion) recognizable by X-ray diffraction, which are understood as corresponding to a stretched fibril portion and a non-stretched node portion, respectively.

(X-ray Diffraction Method)

More specifically, the X-ray diffraction characteristics of film or membrane materials described herein are based on measured results according to the following method.

Figure 2:
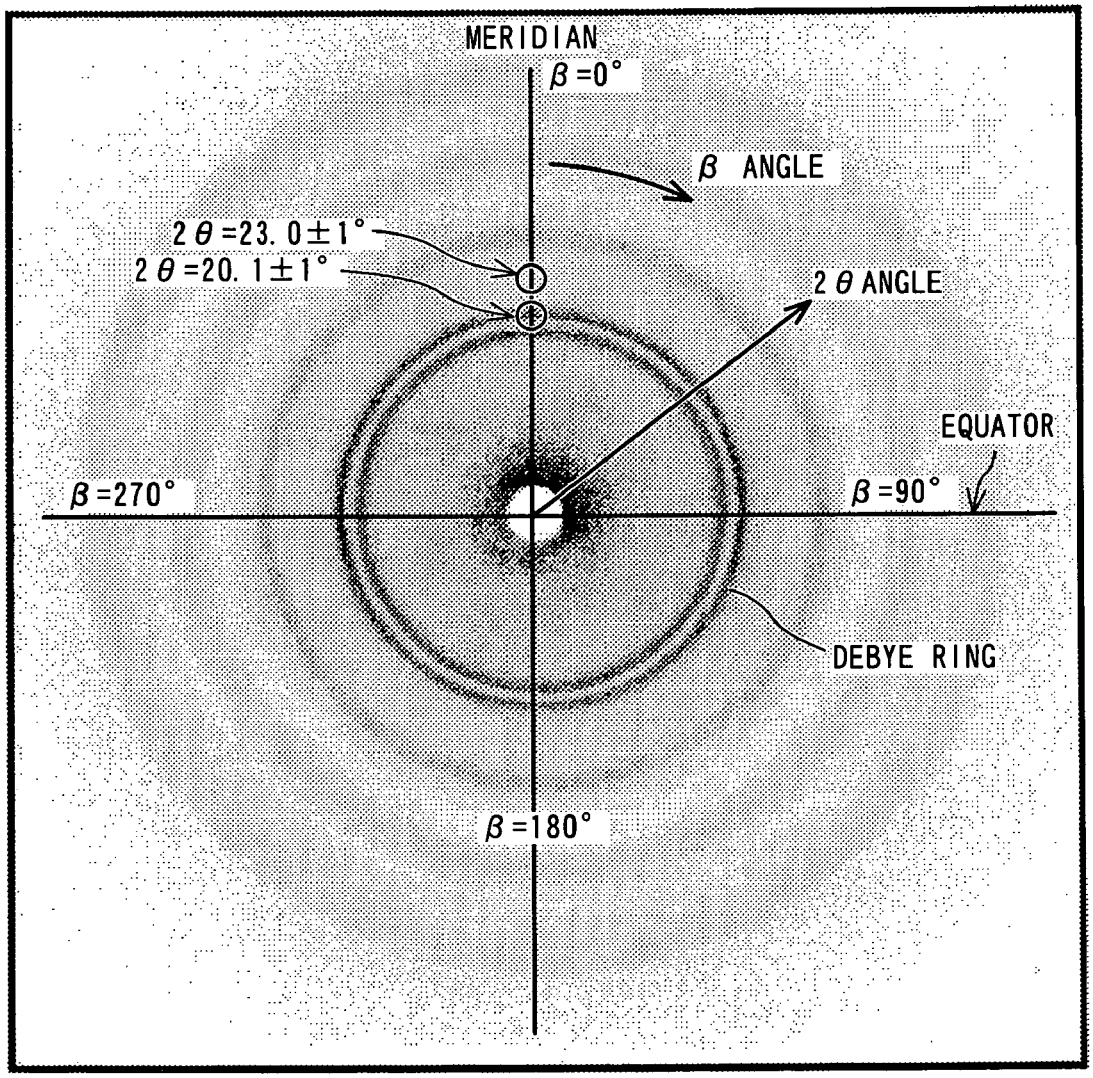
FIG. 2 is an illustration of the X-ray diffraction picture of FIG. 1 with an explanatory note.
Figure 3:
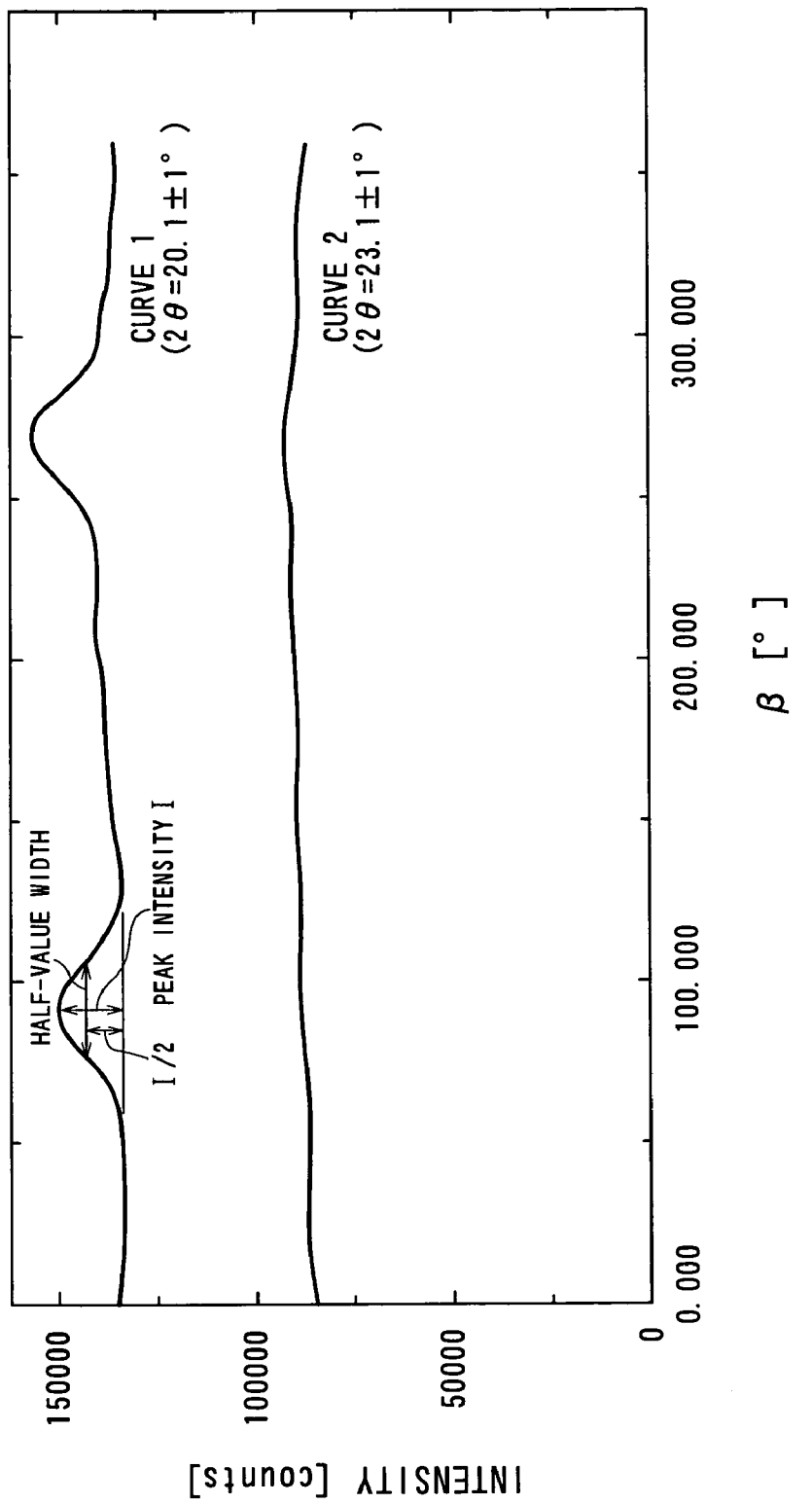
FIG. 3 is a multiply recorded graph of intensity distribution curves versus azimuths (β-angles) at 2θ=20.1±1° and at 2θ=23.0±1° based on X-ray diffraction corresponding to FIG. 1.
Figure 4:
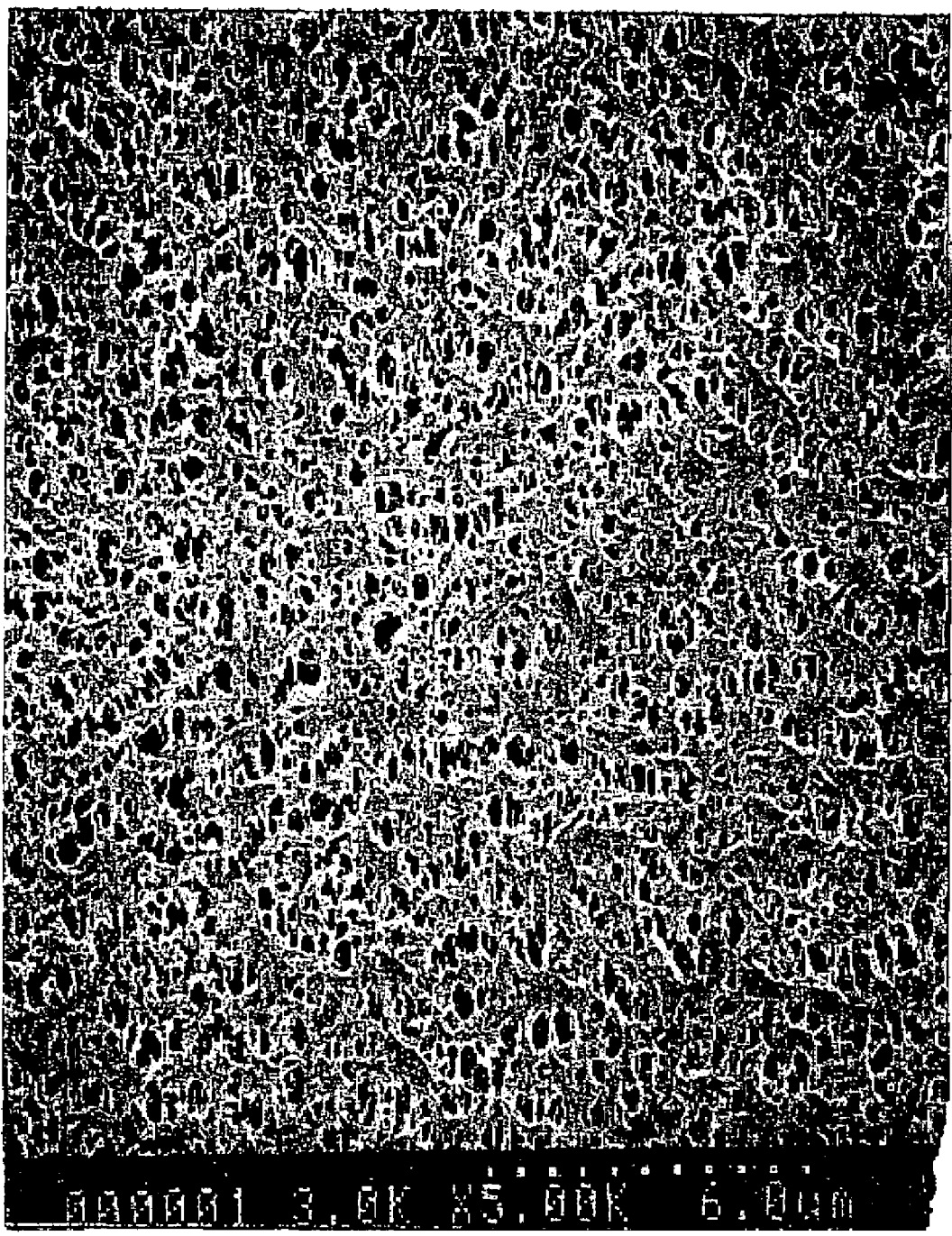
FIG. 4 is a scanning electron microscopic picture (magnification: 5000) of the outer surface of the porous hollow yarn of vinylidene fluoride resin obtained in Example 5.
Figure 5:
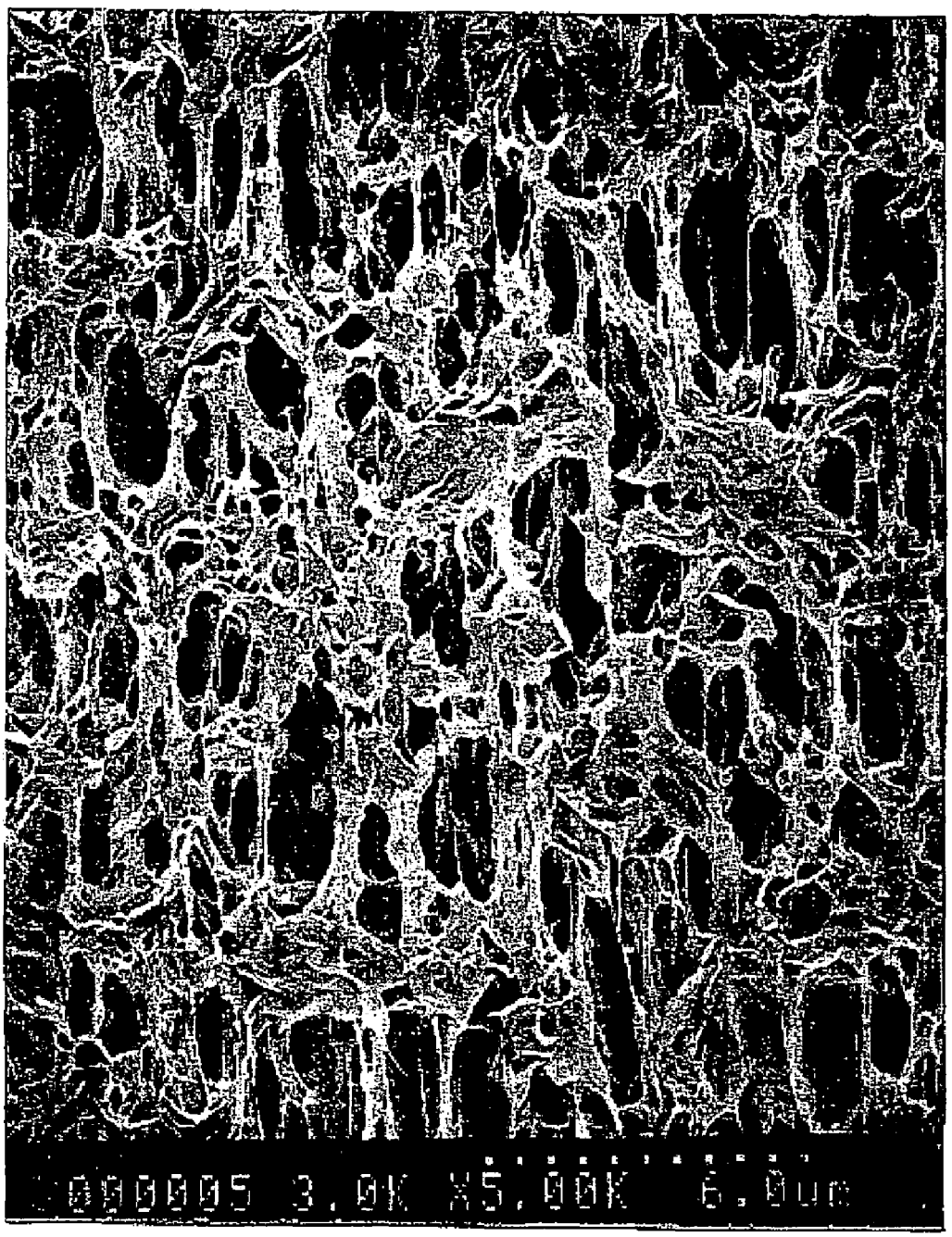
FIG. 5 is a scanning electron microscopic picture (magnification: 5000) of the inner surface of the porous hollow yarn of vinylidene fluoride resin obtained in Example 5.
Figure 6:
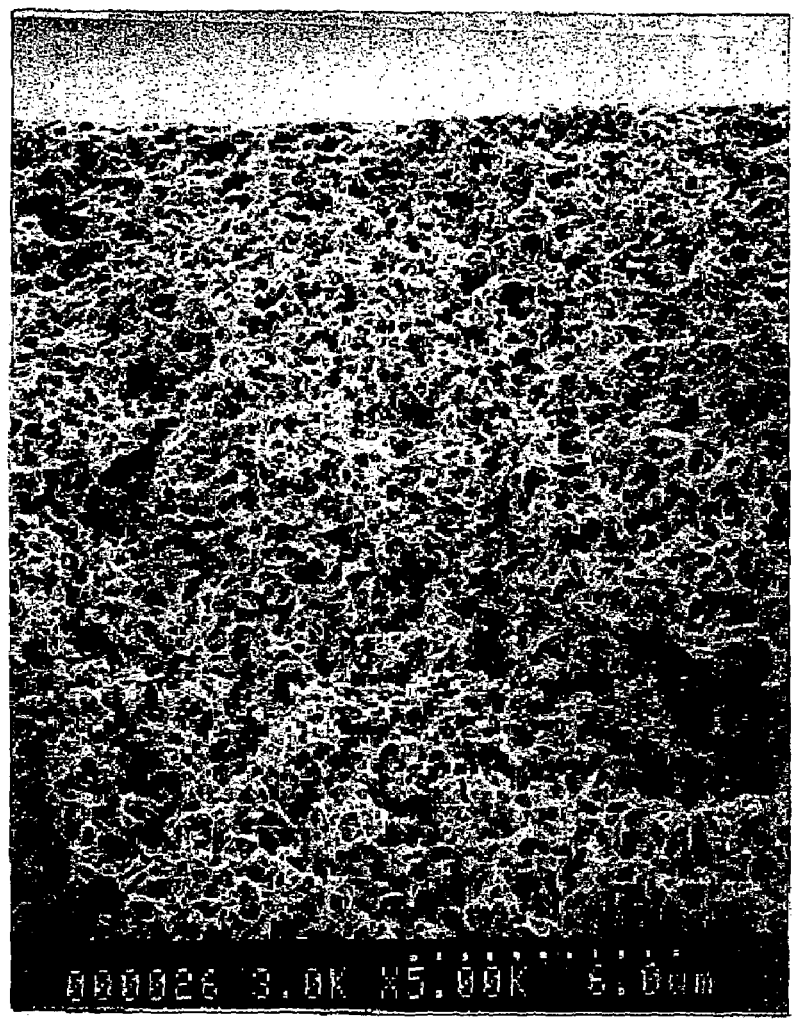
FIG. 6 is a scanning electron microscopic picture (magnification: 5000) of a cross section proximate to the outer surface of the porous hollow yarn of vinylidene fluoride resin obtained in Example 5.
Figure 7:
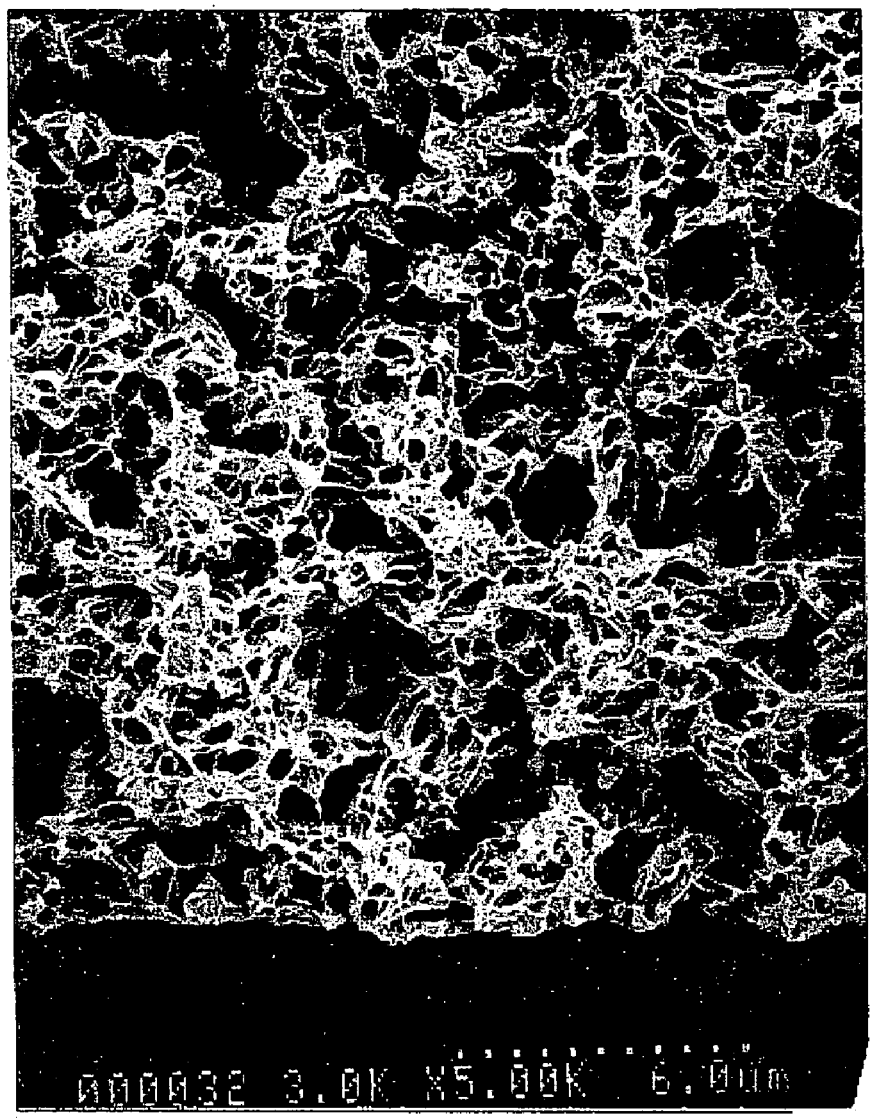
FIG. 7 is a scanning electron microscopic picture (magnification: 5000) of a cross section proximate to the inner surface of the porous hollow yarn of vinylidene fluoride resin obtained in Example 5.

If the film is in the form of a hollow yarn, the yarn was split into halves along a longitudinal direction thereof, and a film sample was attached to a sample stand so that its longitudinal direction was oriented vertically. Then, X-rays were incident in a direction perpendicular to the longitudinal direction. The X-ray generator was "ROTAFLEX 200RB" made by Rigaku Denki K.K., and CuKα rays at 30 kV-100 mA and having passed through an Ni filter were used as an X-ray source. An imaging plate ("BAS-SR127" made by Fuji Shashin Film K.K.) was used to photograph a diffraction image at a sample-imaging plate distance of 60 mm. FIG. 1 represents a diffraction image obtained with respect to a hollow yarn obtained in Example 5 described hereinafter, and FIG. 2 is a explanatory illustration thereof. As is understandable by referring to FIG. 2, β-angle is an angle formed along a Debye ring, and 2θ-angle is an angle formed outwards from the center. FIG. 3 was obtained by multiply recording an intensity distribution curve versus azimuths (β-angles) at $2\theta=20.1\pm1°$ (Curve 1) and an intensity distribution curve versus azimuths (β-angles) at $2\theta=23.1\pm1°$ (Curve 2), respectively, prepared by X-ray diffraction. The Debye ring at $2\theta=20.1\pm1°$ represents a diffraction from (110) plane of α-crystal of PVDF and the intensity at $2\theta=23.1\pm1°$ represents a background intensity of the diffraction X-rays.

In the case of a uniformly non-oriented porous membrane, typically a porous membrane produced through the extraction process or the phase conversion process alone, provides no peak or only a broad peak giving a half-value width of at least 90°. Further, as the crystal directions are at random, the curve 1 exhibits an intensity higher than the curve 2 at any azimuths (β-angles).

On the other hand, in the case of a uniformly oriented sample, typically a porous membrane obtained through only stretching, the crystal directions are selectively oriented, the curve 1 shows sharp peaks at β-angles=90° and 270° i.e., on the equator of a diffraction image. Further, the curve 1 shows only a weak intensity at β-angles=0° and 180 (on the meridian of a diffraction image). As a result, only a curve 1/curve 2 intensity ratio of below 1.1 is given at β-angle=0° or 180°.

In contrast to the above, the porous membrane of the present invention comprising an oriented fibril portion and a non-oriented node portion provides a diffraction image showing a superposition of a diffraction representing a selectively oriented crystal direction and a diffraction representing random crystal directions. More specifically, the curve 1 gives a peak at β-angle=90° or 270° (on the equator of the diffraction image) having a half-value width of at most 80°, preferably at most 60°, further preferably at most 40°, attributable to the oriented fibril portion, and the curve 1 exhibits an intensity higher than the curve 2 at any azimuths (β-angles) and provides a curve 1/curve 2 intensity ratio of at least 1.1, preferably at least 1.2, at β-angle=0° or 180°.

As a result, the presence in mixture of the crystal oriented portion and the crystal non-oriented portion in the porous membrane of the present invention can be quantitatively represented by X-ray diffraction parameters including a diffraction intensity ratio on the meridian of at least 1.1 between those at diffraction angles 2θ=20.1±1° and 2θ=23.0±1°, and an azimuth intensity distribution curve at 2θ=20.1±1° showing a peak having a half-value width of at most 80°.

EXAMPLES

Hereinbelow, the present invention will be described more specifically based on Examples and Comparative Examples. The properties other than the above-mentioned X-ray diffraction characteristics described herein including those described below are based on measured values according to the following methods.

(Weight-Average Molecular Weight (Mw) and Number-average Molecular Weight (Mn))

A GPC apparatus ("GPC-900", made by Nippon Bunko K.K.) was used together with a column of "Shodex KD-806M and a pre-column of "Shodex KD-G" (respectively made by Showa Denko K.K.), and measurement according to GPC (gel permeation chromatography) was performed by using NMP as the solvent at a flow rate of 10 ml/min. at a temperature of 40° C. to measure polystyrene-based molecular weights.

(Porosity)

The length and also the width and thickness (or outer diameter and inner diameter in the case of a hollow yarn) of a sample porous membrane were measured to calculate an apparent volume V (cm$^3$) of the porous membrane, and the weight W (g) of the porous membrane was measured to calculate a porosity according to the following formula:

Porosity (%)=(1−$W$/($V$×ρ))×100, wherein ρ: density of PVDF (=1.78 g/cm$^3$)

(Water Permeation Rate (Flux))

A sample porous membrane was immersed in ethanol for 15 min., then immersed in water to be hydrophilized, and then subjected to a measurement at a water temperature of 25° C. and a pressure difference of 100 kPa. In the case of a hollow yarn-form porous membrane, the area of the membrane was calculated based on the outer diameter according to the following formula:

Membrane area (m$^2$)=(outer diameter)×π×(length).

(Average Pore Diameter)

An average pore diameter was measured according to the half dry method based on ASTM F316-86 and ASTM E1294-89 by using "PERMPOROMETER CFP-2000AEX" made by Porous Materials, Inc. A perfluoropolyester (trade name "Galwick") was used as the test liquid.

(Maximum Pore Diameter)

A maximum pore diameter was measured according to the bubble point method based on ASTM F316-86 and ASTM E1294-89 by using "PERMPOROMETER CFP-2000AEX" made by Porous Materials, Inc. A perfluoropolyester (trade name "Galwick") was used as the test liquid.

(Tensile Strength and Elongation at Break)

Measured by using a tensile tester ("RTM-100", made by Toyo Baldwin K.K.) under the conditions of an initial sample length of 100 mm and a crosshead speed of 200 mm/min. in an environment of a temperature of 23° C. and a relative humidity of 50%.

(Tensile Yield Stress and Elongation)

A porous hollow yarn sample was subjected to a tensile test by using a tensile tester ("RTM-100" made by Toyo Baldwin K.K.) under the conditions of an initial sample length of 100 mm and a tensile speed of 200 m/min. in an environment of a temperature of 23° C. and a relative humidity of 50% to obtain a strain-stress curve. In case where a maximum of stress appeared, the maximum stress point was taken as a yield point. The stress and elongation at the yield point were taken as a tensile yield stress and a tensile yield elongation.

Further, from the tensile yield stress, a fibril yield stress was calculated according to the following formula:

Fibril yield stress ($MPa$) = Tensile yield stress × 100 / (100 − porosity(%)).

Example 1

A first polyvinylidene fluoride (PVDF) (powder) having a weight-average molecular weight (Mw) of 6.59×10$^5$ and a second polyvinylidene fluoride (PVDF) (powder) having Mw=2.52×10$^5$ were blended in proportions of 12.5 wt. % and 87.5 wt. %, respectively, by a Henschel mixer to obtain a mixture A having Mw=3.03×10$^5$ and an Mw/Mn (number-average molecular weight) ratio of 2.53.

An adipic acid-based polyester plasticizer ("PN-150", made by Asahi Denka Kogyo K.K.) as an aliphatic polyester and N-methylpyrrolidone (NMP) as a solvent were mixed under stirring in a ratio of 87.5 wt. %/12.5 wt. % at room temperature to obtain a mixture B.

An equi-directional rotation and engagement-type twin-screw extruder ("BT-30", made by Plastic Kogaku Kenkyusyo K.K.; screw diameter: 30 mm, L/D=48) was used, and the mixture A was supplied from a powder supply port at a position of 80 mm from the upstream end of the cylinder and the mixture B heated to 100° C. was supplied from a liquid supply port at a position of 480 mm from the upstream end of the cylinder at a ratio of mixture A/mixture B=37.5/62.5 (wt. %), followed by kneading at a barrel temperature of 210° C. to extrude the melt-kneaded product through a nozzle having an annular slit of 7 mm in outer diameter and 3.5 mm in inner diameter into a hollow yarn-form extrudate at a rate of 13 g/min.

The extruded mixture in a molten state was introduced into a water bath having a surface 10 mm distant from the nozzle (i.e., an air gap of 10 mm) to be cooled and solidified (at a residence time in water bath of ca. 10 sec.), pulled up at a take-up speed of 5 m/min. and wound up to obtain a first intermediate form.

Then, the first intermediate form was fixed so as not to shrink in the longitudinal direction and, while being kept in the fixed state, was immersed under vibration in dichloromethane at room temperature for 30 min, followed by immersion in fresh dichloromethane again under the same conditions to extract the aliphatic polyester and solvent and further by 1 hour of heating in an oven at 120° C., while being continually fixed, for removal of the dichloromethane and heat treatment, thereby to obtain a second intermediate form.

Then, the second intermediate form was longitudinally stretched at a ratio of 1.6 times at an environmental temperature of 25° C. and then heated for 1 hour in an oven at a temperature of 100° C. for heat setting to obtain a polyvinylidene fluoride-based porous hollow yarn.

The thus-obtained polyvinylidene fluoride-based porous hollow yarn exhibited physical properties including: an outer diameter of 1.486 mm, an inner diameter of 0.702 mm, a thickness of 0.392 mm, a porosity of 72%, a water permeation rate of 18.01 $m^3/m^2 \cdot day \cdot 100$ kPa, an average pore diameter of 0.0864 μm, a maximum pore diameter of 0.1839 μm, a tensile strength of 9.1 MPa and an elongation at break of 7%.

The production conditions and the physical properties of the resultant polyvinylidene fluoride-based porous hollow membrane are inclusively shown in Tables 1 and 2 appearing hereinafter together with those of Examples and Comparative Examples described below.

Example 2

A porous hollow yarn was prepared in the same manner as in Example 1 except that the cooling water bath temperature for cooling the melt extrudate was changed to 11° C., and the stretching ratio was changed to 1.8 times.

Example 3

A porous hollow yarn was prepared in the same manner as in Example 2 except that the supply ratio of mixture A/mixture B was changed to 42.9/57.1 (wt. %).

Example 4

A porous hollow yarn was prepared in the same manner as in Example 2 except that the mixing ratio of the first PVDF/the second PVDF was changed to 50/50 (wt. %) to obtain a mixture A, the air gap was increased to 40 mm and the stretching ratio was changed to 2.4 times.

Example 5

A porous hollow yarn was prepared in the same manner as in Example 4 except that the stretching ratio was changed to 1.8 times.

An X-ray diffraction picture of the resultant porous hollow yarn is shown in FIG. 1 and an explanatory note thereof is given in FIG. 2. Further, FIG. 3 shows a multiply recorded graph of intensity distribution curves versus azimuths (β-angles) at 2θ=20.1±1° and at 2θ=23.0±1°.

Further, scanning electron microscopic photographs (at a magnification of 5000) of an outer surface, an inner surface, a cross-section proximate to the outer surface and a cross-section proximate to the inner surface of the resultant porous hollow yarn, are shown in FIGS. 4-7, respectively.

Example 6

A porous hollow yarn was prepared in the same manner as in Example 5 except that the cooling water bath temperature was changed to 40° C. and the air gap from the nozzle to the cooling bath surface was changed to 40 mm.

Examples 7-9

Porous hollow yarns were prepared in the same manner as in Example 6 except that the cooling was bath temperatures were changed to 60°0 C. (Example 7), 70° C. (Example 8) and 11° C. (Example 9), respectively.

Example 10

A porous hollow yarn was prepared in the same manner as in Example 2 except that a mixture A was formed by changing the ratio of the first PVDF/the second PVDF to 5/95 (wt. %), and the air gap was changed to 5 mm.

Comparative Example 1

The preparation of porous hollow yarn was tried in the same manner as in Example 5 except that a PVDF having a weight-average molecular weight of $4.92 \times 10^5$ was used alone instead of the mixture A, the PVDF/mixture B supply ratio was changed to 42.9/57.1 wt. % (same as in Example 3) and the stretching ratio was changed to 2.0 times, whereas the yarn was severed during the stretching.

Comparative Example 2

A porous hollow yarn was prepared under the same conditions as in Comparative Example 1 except that the take-up speed after cooling and solidification of the melt-extruded composition was changed to 10 m/min.

Comparative Example 3

The production of porous hollow yarn was tried under the same condition as in Example 5 except that the first PVDF (Mw=$6.59 \times 10^5$) was used alone instead of the mixture A, the PVDF/mixture B supply ratio was changed to 33.3/66.7 (wt. %) and the air gap was changed to 300 mm, whereas the yarn was severed during the stretching.

Comparative Example 4

A porous hollow yarn was prepared under the same conditions as in Comparative Example 3 except that the stretching ratio was lowered to 1.3 times.

Comparative Example 5

A porous hollow yarn was prepared under the same conditions as in Comparative Example 3 except that the take-up speed after cooling and solidification of the melt-extruded composition was changed to 10 m/min.

Comparative Example 6

The production of porous hollow yarn was tried under the same condition as in Example 2 except that a PVDF of Mw=$2.52 \times 10^5$ (used as the second PVDF in Example 2) alone was used instead of the mixture A, whereas the yarn was severed during the stretching.

Comparative Example 7

The production of porous hollow yarn was tried under the same condition as in Comparative Example 6 except that the take-up speed after cooling and solidification of the melt-extruded composition was changed to 10 m/min., whereas the yarn was severed during the stretching.

Comparative Example 8

A porous hollow yarn was prepared under the same conditions as in Comparative Example 6 except that the take-up speed after cooling and solidification of the melt-extruded composition was changed to 20 m/min.

The physical properties of porous hollow yarns that could be obtained without causing severance of yarn during the stretching are inclusively shown in Table 2.

TABLE 1

|  |  |  | Example 1 | Example 2 | Example 3 | Example 4 | Example 5 |
|---|---|---|---|---|---|---|---|
| Starting material composition | Mixture A | 1st. PVDF's Mw ($\times 10^5$) | 6.59 | 6.59 | 6.59 | 6.59 | 6.59 |
| | | 2nd. PVDF's Mw ($\times 10^5$) | 2.52 | 2.52 | 2.52 | 2.52 | 2.52 |
| | | 1st. PVDF/2nd. PVDF mixing ratio | 12.5/87.5 | 12.5/87.5 | 12.5/87.5 | 50/50 | 50/50 |
| | | Mixture's Mw ($\times 10^5$) | 3.03 | 3.03 | 3.03 | 4.56 | 4.56 |
| | | Mw/Mn | 2.53 | 2.53 | 2.53 | 2.94 | 2.94 |
| | Mixture B | Polyester plasticizer | PN-150 | PN-150 | PN-150 | PN-150 | PN-150 |
| | | Solvent | NMP | NMP | NMP | NMP | NMP |
| | | Plasticizer/solvent mixing ratio (wt. %) | 87.5/12.5 | 87.5/12.5 | 87.5/12.5 | 87.5/12.5 | 87.5/12.5 |
| | | Mixture A/Mixture B Supply ratio (wt. %) | 37.5/62.5 | 37.5/62.5 | 42.9/57.1 | 37.5/62.5 | 37.5/62.5 |
| Spinning and stretching conditions | | Air gap (mm) | 10 | 10 | 10 | 140 | 140 |
| | | Water bath temp. (° C.) | 60 | 11 | 11 | 11 | 11 |
| | | Take-up speed (m/min) | 5 | 5 | 5 | 5 | 5 |
| | | Stretch ratio | 1.6 | 1.8 | 1.8 | 2.4 | 1.8 |
| Physical properties | | Outer diameter (mm) | 1.486 | 1.549 | 1.527 | 1.469 | 1.62 |
| | | Inner diameter (mm) | 0.702 | 0.736 | 0.796 | 0.502 | 0.542 |
| | | Thickness (mm) | 0.392 | 0.407 | 0.366 | 0.484 | 0.539 |
| | | Porosity (%) | 72 | 77 | 69 | 78 | 72 |
| | | Water permeation rate ($m^3/m^2 \cdot day \cdot 100$ kPa) | 18.01 | 13.48 | 7.46 | 5.84 | 5.28 |
| | | Ave. pore diameter (μm) | 0.0864 | 0.0717 | — | — | 0.0654 |
| | | Max. pore diameter (μm) | 0.1839 | 0.1454 | — | — | 0.1445 |
| | | Tensile strength (MPa) | 9.1 | 8.9 | 16.9 | 17.1 | 13.9 |
| | | Elongation at break (%) | 7 | 8.7 | 12 | 47 | 77 |
| | | Yield stress (MPa) | 8.9 | 8.9 | 16.9 | 17.2 | 13.1 |
| | | Yield elongation (%) | 5 | 7 | 9 | 11 | 9 |
| | | Fibril yield stress (MPa) | 31.7 | 38.7 | 54.4 | 78 | 46.8 |
|  |  |  | Example 6 | Example 7 | Example 8 | Example 9 | Example 10 |
| Starting material composition | Mixture A | 1st. PVDF's Mw ($\times 10^5$) | 6.59 | 6.59 | 6.59 | 6.59 | 6.59 |
| | | 2nd. PVDF's Mw ($\times 10^5$) | 2.52 | 2.52 | 2.52 | 2.52 | 2.52 |
| | | 1st. PVDF/2nd. PVDF mixing ratio | 50/50 | 50/50 | 50/50 | 50/50 | 5/95 |
| | | Mixture's ($\times 10^5$) | 4.56 | 4.56 | 4.56 | 4.56 | 2.83 |
| | | Mw/Mn | 2.94 | 2.94 | 2.94 | 2.94 | 2.53 |
| | Mixture B | Polyester plasticizer | PN-150 | PN-150 | PN-150 | PN-150 | PN-150 |
| | | Solvent | NMP | NMP | NMP | NMP | NMP |
| | | Plasticizer/solvent mixing ratio (wt. %) | 87.5/12.5 | 87.5/12.5 | 87.5/12.5 | 87.5/12.5 | 87.5/12.5 |
| | | Mixture A/Mixture B Supply ratio (wt. %) | 37.5/62.5 | 37.5/62.5 | 37.5/62.5 | 37.5/62.5 | 37.5/62.5 |
| Spinning and stretching conditions | | Air gap (mm) | 40 | 40 | 40 | 40 | 5 |
| | | Water bath temp. (° C.) | 40 | 60 | 80 | 11 | 11 |
| | | Take-up speed (m/min) | 5 | 5 | 5 | 5 | 5 |
| | | Stretch ratio | 1.8 | 1.8 | 1.8 | 1.8 | 1.8 |
| Physical properties | | Outer diameter (mm) | 1.51 | 1.488 | 1.455 | 1.500 | 1.581 |
| | | Inner diameter (mm) | 0.561 | 0.705 | 0.653 | 0.550 | 0.931 |
| | | Thickness (mm) | 0.475 | 0.392 | 0.401 | 0.475 | 0.325 |
| | | Porosity (%) | 78 | 72 | 72 | 75 | 72 |
| | | Water permeation rate ($m^3/m^2 \cdot day \cdot 100$ kPa) | 12.09 | 8.17 | 10.2 | 5.75 | 11.3 |
| | | Ave. pore diameter (μm) | 0.087 | 0.0709 | 0.1067 | — | 0.079 |
| | | Max. pore diameter (μm) | 0.1513 | 0.1443 | 0.303 | — | 0.150 |
| | | Tensile strength (MPa) | 10.3 | — | — | 17 | 8.2 |
| | | Elongation at break (%) | 13 | — | — | 30 | 8.1 |
| | | Yield stress (MPa) | 10.3 | — | — | 17.1 | — |
| | | Yield elongation (%) | 9 | — | — | 11 | — |
| | | Fibril yield stress (MPa) | 46.7 | — | — | 68.2 | — |

TABLE 2

|  |  | Example |  |  |  |  |  |  |  |
|---|---|---|---|---|---|---|---|---|---|
|  |  | Comp. 1 | Comp. 2 | Comp. 3 | Comp. 4 | Comp. 5 | Comp. 6 | Comp. 7 | Comp. 8 |
| Starting material composition | Mixture A 1st. PVDF's Mw ($\times 10^5$) | 4.92 | 4.92 | 6.59 | 6.59 | 6.59 | 2.52 | 2.52 | 2.52 |
|  | 2nd. PVDF's Mw ($\times 10^5$) | None | None | None | None | None | None | None | None |
|  | 1st. PVDF/2nd. PVDF mixing ratio | 100/0 | 100/0 | 100/0 | 100/0 | 100/0 | 100/0 | 100/0 | 100/0 |
|  | Mixture's Mw ($\times 10^5$) | 4.92 | 4.92 | 6.59 | 6.59 | 6.59 | 2.52 | 2.52 | 2.52 |
|  | Mw/Mn | 2.13 | 2.13 | 2.25 | 2.25 | 2.25 | 2.27 | 2.27 | 2.27 |
|  | Mixture B Polyester plasticizer | PN-150 | PN-150 | PN-150 | PN-150 | PN-150 | PN-150 | PN-150 | PN-150 |
|  | Solvent | NMP | NMP | NMP | NMP | NMP | NMP | NMP | NMP |
|  | Plasticizer/solvent mixing ratio (wt. %) | 87.5/12.5 | 87.5/12.5 | 87.5/12.5 | 87.5/12.5 | 87.5/12.5 | 87.5/12.5 | 87.5/12.5 | 87.5/12.5 |
|  | Mixture A/Mixture B Supply ratio (wt. %) | 42.9/57.1 | 42.9/57.1 | 33.3/66.7 | 33.3/66.7 | 33.3/66.7 | 37.5/62.5 | 37.5/62.5 | 37.5/62.5 |
| Spinning and stretching conditions | Air gap (mm) | 140 | 140 | 300 | 300 | 300 | 10 | 10 | 10 |
|  | Water bath temp. (° C.) | 11 | 11 | 11 | 11 | 11 | 11 | 11 | 11 |
|  | Take-up speed (m/min) | 5 | 10 | 5 | 5 | 10 | 5 | 10 | 20 |
|  | Stretch ratio | 2 | 2 | 1.8 | 1.3 | 1.8 | 1.8 | 1.8 | 1.8 |
| Physical properties | Outer diameter (mm) | ** | 0.904 | ** | 1.66 | 0.929 | ** | ** | 0.742 |
|  | Inner diameter (mm) | — | 0.41 | — | 0.772 | 0.403 | — | — | 0.34 |
|  | Thickness (mm) | — | 0.247 | — | 0.444 | 0.263 | — | — | 0.201 |
|  | Porosity (%) | — | 60 | — | 60 | 65 | — | — | 71 |
|  | Water permeation rate ($m^3/m^2 \cdot day \cdot 100$ kPa) | — | 1.05 | — | 1.76 | 1.63 | — | — | 3.89 |
|  | Ave. pore size (µm) | — | — | — | — | — | — | — | — |
|  | Max. pore size (µm) | — | — | — | — | — | — | — | — |
|  | Tensile strength (MPa) | — | 37.1 | — | — | — | — | — | — |
|  | Elongation at break (%) | — | 44 | — | — | — | — | — | — |

** Severed during the stretching.

Example 11

The porous hollow yarn obtained in Example 1 was fixed so as not to shrink in the longitudinal direction and, while being kept in the fixed state, was immersed in ethanol for 15 min. and then in water for 15 min. to be hydrolyzed, followed further by 1 hour of immersion in 20%-caustic soda aqueous solution (pH 14) maintained at 70° C., washing with water and 1 hour of drying in a hot oven maintained at 60° C.

Example 12

The porous hollow yarn obtained in Example 1 was fixed so as not to shrink in the longitudinal direction and, while being kept in the fixed state, was immersed in ethanol for 15 min. and then in water for 15 min. to be hydrolyzed, followed further by 1 hour of immersion in 35% hydrochloric acid aqueous solution (pH 1) at room temperature, washing with water and 1 hour of drying in a hot oven maintained at 60° C.

Example 13

The porous hollow yarn obtained in Example 1 was fixed so as not to shrink in the longitudinal direction and, while being kept in the fixed state, was immersed under vibration in dichloromethane for 30 min. and again immersed in fresh dichloromethane under the same conditions, followed further by 1 hour of drying in a hot oven maintained at 60° C.

The porous hollow yarns obtained after the elution liquid treatments in Examples 11 to 13 were subjected to measurement of porosity, water permeation rate, average pore diameter, maximum pore diameter, tensile strength and elongation at break. The results are inclusively shown in Table 3 below in parallel with those of Example 1.

TABLE 3

|  |  | Example | | | |
|---|---|---|---|---|---|
|  |  | 11 | 12 | 13 | 1 |
|  | Elution liquid | Alkaline liquid | Acidic liquid | Organic solvent | None |
| Physical properties | Porosity (%) | 74 | 73 | 75 | 72 |
|  | Water permeation rate ($m^3/m^2 \cdot day \cdot 100$ kPa) | 36.6 | 31.8 | 35.7 | 18.01 |
|  | Average pore diameter (µm) | 0.0964 | 0.0914 | 0.0890 | 0.0864 |
|  | Maximum pore diameter (µm) | 0.1840 | 0.1800 | 0.0810 | 0.1839 |
|  | Tensile strength (MPa) | 7.1 | 9.3 | 9.7 | 9.1 |
|  | Elongation at break (%) | 6 | 9 | 13 | 7 |

INDUSTRIAL APPLICABILITY

As is understood from the results in Table 1 in comparison with Table 2, the present invention provides a porous membrane of vinylidene fluoride resin which has pores of appropriate size and distribution and also excellent mechanical strength represented by tensile strength and elongation at break and is useful as a microfiltration membrane or a separator for batteries, by subjecting a melt-extruded composition obtained by mixing a vinylidene fluoride resin having a molecular weight distribution which is appropriately broad and high as a whole with a plasticizer and a good solvent for vinylidene fluoride resin, to cooling for solidification from one surface, extraction of the plasticizer and stretching. Further, in view of Table 3, it is found possible to attain a remarkably increased water permeation rate by the subjecting the thus-obtained porous membrane (Example 1) to treatment with an elution liquid of alkali, acid or organic solvent.

The invention claimed is:

1. A hollow yarn porous membrane of vinylidene fluoride resin for water filtration, comprising a hollow yarn-form porous membrane of:
   (A) a vinylidene fluoride resin having a weight-average molecular weight of at least 200,000 and a ratio of weight-average molecular weight/number-average molecular weight of at least 2.5, or
   (B) a vinylidene fluoride resin comprising 2-75 wt. % of a first vinylidene fluoride resin having a weight-average molecular weight of 400,000-1,200,000 and 25-98 wt. % of a second vinylidene fluoride resin having a weight-average molecular weight of 150,000-600,000 giving a ratio of the weight-average molecular weight of the first vinylidene fluoride resin/the weight-average molecular weight of the second vinylidene fluoride resin of at least 1.2,
   wherein a crystalline oriented portion and a crystalline non-oriented portion are present in mixture as confirmed by X-ray diffraction.

2. A porous membrane according to claim 1, wherein the vinylidene fluoride resin comprises 5-75 wt. % of a first vinylidene fluoride resin having a weight-average molecular weight of 400,000-1,200,000 and 25-95 wt. % of a second vinylidene fluoride resin having a weight-average molecular weight of 150,000-600,000 giving a ratio of the weight-average molecular weight of the first vinylidene fluoride resin/the weight-average molecular weight of the second vinylidene fluoride resin of at least 1.2.

3. A porous membrane according to claim 1, having a porosity of 55-90%, a tensile strength of at least 5 MPa and an elongation at break of at least 5%.

4. A porous membrane according to claim 1, having a tensile yield strength of at least 5 MPa and a yield elongation of at least 5%.

5. A porous membrane according to claim 1, having a water permeation rate of at least 5 $m^3/m^2 \cdot day \cdot 100$ kPa.

6. A porous membrane according to claim 1, having a form of hollow yarn having a thickness of 5-800 μm and an outer diameter of 0.3-3 mm.

7. A process for producing a hollow yarn porous membrane of vinylidene fluoride resin for water filtration, comprising:

providing a composition by adding 70-250 wt. parts of a plasticizer and 5-80 wt. parts of a good solvent for vinylidene fluoride resin to 100 wt. parts of (A) a vinylidene fluoride resin having a weight-average molecular weight of at least 200,000 and a ratio of weight-average molecular weight/number-average molecular weight of at least 2.5, or (B) a vinylidene fluoride resin comprising 2-75 wt. % of a first vinylidene fluoride resin having a weight-average molecular weight of 400,000-1,200,000 and 25-98 wt. % of a second vinylidene fluoride resin having a weight-average molecular weight of 150,000-600,000 giving a ratio of the weight-average molecular weight of the first vinylidene fluoride resin/the weight-average molecular weight of the second vinylidene fluoride resin of at least 1.2;

melt-extruding the composition to form a hollow yarn film, cooling the hollow yarn film preferentially from an outer surface thereof within a cooling medium at 5-120° C. to form a hollow yarn solid film, extracting the plasticizer, and then stretching the hollow yarn film.

8. A process according to claim 7, wherein said composition is provided by mixing the good solvent and the plasticizer in a total amount of 100-250 wt. parts containing 5-30 wt. % of the good solvent with 100 wt. parts of the vinylidene fluoride resin.

9. A process according to claim 7, further including a step of treating the porous membrane after the stretching with an elution liquid.

10. A process according to claim 9 wherein the elution liquid is an alkaline liquid at a pH of at least 12.

11. A process according to claim 10 wherein the elution liquid is an acidic liquid at a pH of at most 4.

12. A process according to claim 10 wherein the elution liquid is an extraction liquid for the plasticizer.

13. A porous membrane according to claim 2, having a porosity of 55-90%, a tensile strength of at least 5 MPa and an elongation at break of at least 5%.

14. A porous membrane according to claim 2, having a tensile yield strength of at least 5 MPa and a yield elongation of at least 5%.

15. A porous membrane according to claim 3, having a tensile yield strength of at least 5 MPa and a yield elongation of at least 5%.

16. A porous membrane according to claim 2, having a water permeation rate of at least 5 $m^3/m^2 \cdot day \cdot 100$ kPa.

17. A porous membrane according to claim 3, having a water permeation rate of at least 5 $m^3/m^2 \cdot day \cdot 100$ kPa.

18. A porous membrane according to claim 4, having a water permeation rate of at least 5 $m^3/m^2 \cdot day \cdot 100$ kPa.

19. A porous membrane according to claim 2, having a form of hollow yarn having a thickness of 5-800 μm and an outer diameter of 0.3-3 mm.

20. A process according to claim 8, further including a step of treating the porous membrane after the stretching with an elution liquid.

* * * * *